(12) United States Patent
Kreikemeier et al.

(10) Patent No.: US 12,453,051 B2
(45) Date of Patent: Oct. 21, 2025

(54) NON-CONTACT DISPLACEMENT MEASUREMENT FOR CRYOGENIC STABILIZATION

(71) Applicant: IonQ, Inc., College Park, MD (US)

(72) Inventors: Sarah Margaret Kreikemeier, Washington, DC (US); Kai Makoto Hudek, Hyattsville, MD (US)

(73) Assignee: IonQ, Inc., College Park, MD (US)

( * ) Notice: Subject to any disclaimer, the term of this patent is extended or adjusted under 35 U.S.C. 154(b) by 446 days.

(21) Appl. No.: 18/069,766

(22) Filed: Dec. 21, 2022

(65) Prior Publication Data

US 2023/0200016 A1 Jun. 22, 2023

Related U.S. Application Data

(60) Provisional application No. 63/292,977, filed on Dec. 22, 2021.

(51) Int. Cl.
*H05K 7/20* (2006.01)
*F17C 3/08* (2006.01)
*G06F 1/20* (2006.01)
*G01D 5/241* (2006.01)
*G01D 5/26* (2006.01)

(52) U.S. Cl.
CPC .......... *H05K 7/20372* (2013.01); *F17C 3/085* (2013.01); *G06F 1/20* (2013.01); *F17C 2221/017* (2013.01); *G01D 5/2417* (2013.01); *G01D 5/266* (2013.01)

(58) Field of Classification Search
CPC .............................. G21K 1/003; G21K 1/006
See application file for complete search history.

(56) References Cited

U.S. PATENT DOCUMENTS 9,746,321 B2 * 8/2017 Tarbutton ............. G01B 11/002
2019/0348251 A1 * 11/2019 Monroe .................. H01J 37/08

* cited by examiner

*Primary Examiner* — David P Porta
(74) *Attorney, Agent, or Firm* — ARENTFOX SCHIFF LLP

(57) ABSTRACT

Aspects of the present disclosure relate generally to systems and methods for use in the implementation and/or operation of quantum information processing (QIP) systems, and more particularly, to the implementation and operation of a non-contact displacement measurement technique for cryogenic stabilization in QIP systems.

20 Claims, 5 Drawing Sheets

NON-CONTACT DISPLACEMENT MEASUREMENT FOR CRYOGENIC STABILIZATION

CROSS-REFERENCE TO RELATED APPLICATION

This application claims the benefit of U.S. Provisional Patent Application No. 63/292,977, filed Dec. 22, 2021, the entire contents of which are hereby incorporated by reference.

TECHNICAL FIELD

Aspects of the present disclosure relate generally to systems and methods for use in the implementation and/or operation of quantum information processing (QIP) systems.

BACKGROUND

Trapped atoms are one of the leading implementations for quantum information processing or quantum computing. Atomic-based qubits may be used as quantum memories, as quantum gates in quantum computers and simulators, and may act as nodes for quantum communication networks. Qubits based on trapped atomic ions enjoy a rare combination of attributes. For example, qubits based on trapped atomic ions have very good coherence properties, may be prepared and measured with nearly 100% efficiency, and are readily entangled with each other by modulating their Coulomb interaction with suitable external control fields such as optical or microwave fields. These attributes make atomic-based qubits attractive for extended quantum operations such as quantum computations or quantum simulations.

It is therefore important to develop new techniques that improve the design, fabrication, implementation, and/or control of different QIP systems used as quantum computers or quantum simulators, and particularly for those QIP systems that handle operations based on atomic-based qubits.

SUMMARY

The following presents a simplified summary of one or more aspects to provide a basic understanding of such aspects. This summary is not an extensive overview of all contemplated aspects and is intended to neither identify key or critical elements of all aspects nor delineate the scope of any or all aspects. Its sole purpose is to present some concepts of one or more aspects in a simplified form as a prelude to the more detailed description that is presented later.

This disclosure describes various aspects of the implementation and operation of a non-contact displacement measurement technique for cryogenic stabilization in QIP systems.

In some aspects, a quantum information processing (QIP) system includes a cryostat comprising a chamber including at least one stage, a component coupled to the at least one stage, an actuator coupled to the component, a non-contact displacement measurement system, and a controller. The non-contact displacement measurement system is configured to determine information indicative of displacement of the component during operation of the cryostat. The controller is configured to receive the information indicative of the displacement of the component from the non-contact displacement measuring system; and generate a repositioning command for the actuator to reposition the component based on the information indicative of the displacement of the component.

In some aspects, a method for performing a non-contact displacement measurement for cryogenic stabilization in quantum information processing (QIP) systems includes receiving information indicative of displacement of a component coupled within a chamber of a cryostat of the QIP system during operation of the cryostat from a non-contact displacement measurement system. The component is coupled to a stage of the cryostat. The method includes generating a component repositioning command based on the information indicative of the displacement of the component. The method includes commanding an actuator coupled to the component to reposition the component.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

Figure 1:
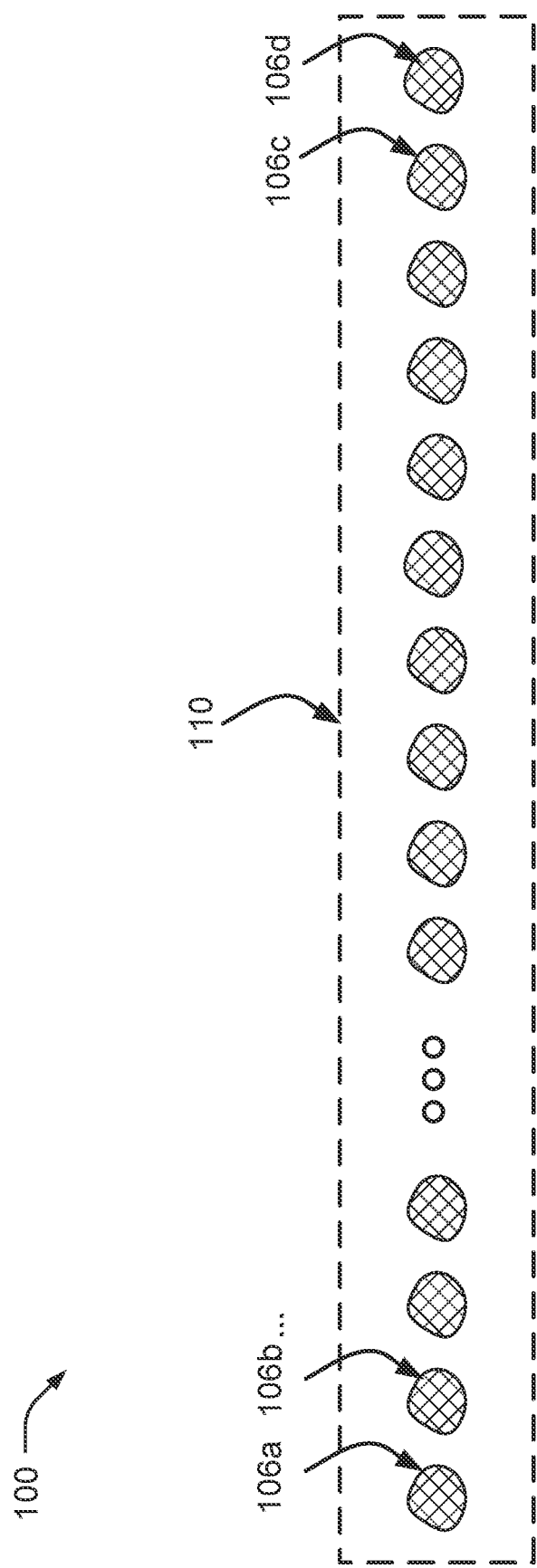
FIG. 1 illustrates a view of atomic ions a linear crystal or chain in accordance with aspects of this disclosure.

The detailed description set forth below in connection with the appended drawings or figures is intended as a description of various configurations or implementations and is not intended to represent the only configurations or implementations in which the concepts described herein may be practiced. The detailed description includes specific details for the purpose of providing a thorough understanding of various concepts. However, it will be apparent to those skilled in the art that these concepts may be practiced without these specific details or with variations of these specific details. In some instances, well known components are shown in block diagram form, while some blocks may be representative of one or more well-known components.

Some QIP systems may be implemented using cryogenic environments (e.g., cryostats or cryogenic chambers) to improve operational performance. One example is for operations to be perform at environments of approximately 4 Kelvin. This can be achieved by having one or more stages. For example, the cryogenic environment may include a first stage or first environment at 40 Kelvin, and a second stage or second environment within the first stage at 4 Kelvin. Other implementations with more than two stages are also possible.

Some QIP systems that use trapped ions as qubits may have the ions inside a cryogenic environment. This environment or chamber may also include other components used in the operation of the QIP system. In some instances, components inside a cryogenic environment (e.g., optical components, ion traps) may need to be moved or aligned for optimal operation of the QIP system. Positioners, or more specifically, nanopositioners or nanopositioning stages, are used to provide the needed motion or alignment. This motion or alignment may also be used to compensate or adjust for vibrations that may occur because of the cryogenic environment. For example, the pumping of liquid or gaseous helium necessary for creating cryogenic conditions introduces vibration into cryogenic chambers, known as cryostats. Applications requiring highly stable operating conditions can be limited by the vibrations from the pumping cryocooler and helium flowing through the one or more stages of the cryostat. To achieve stability between components mounted inside and outside of the cryostat, non-contact sensing methods can be used to measure relative displacement between the components, which then can be used to compensate for the disturbances.

Solutions to the issues described above are explained in more detail in connection with FIGS. 1-5, with FIGS. 1-3 providing a background of QIP systems or quantum computers, and more specifically, of atomic-based QIP systems or quantum computers. This disclosure proposes techniques for monitoring cryogenic vibrations and implementing either feedback or feed-forward control to null the impact of the vibration on components mounted inside of the cryostat for stabilization, such as interferometric stabilization, for example. Moreover, capacitive displacement sensors are identified as one implementation of a non-contact monitoring tool and piezo transducers are identified as one way to implement corrective actions from a control system.

Figure 2:
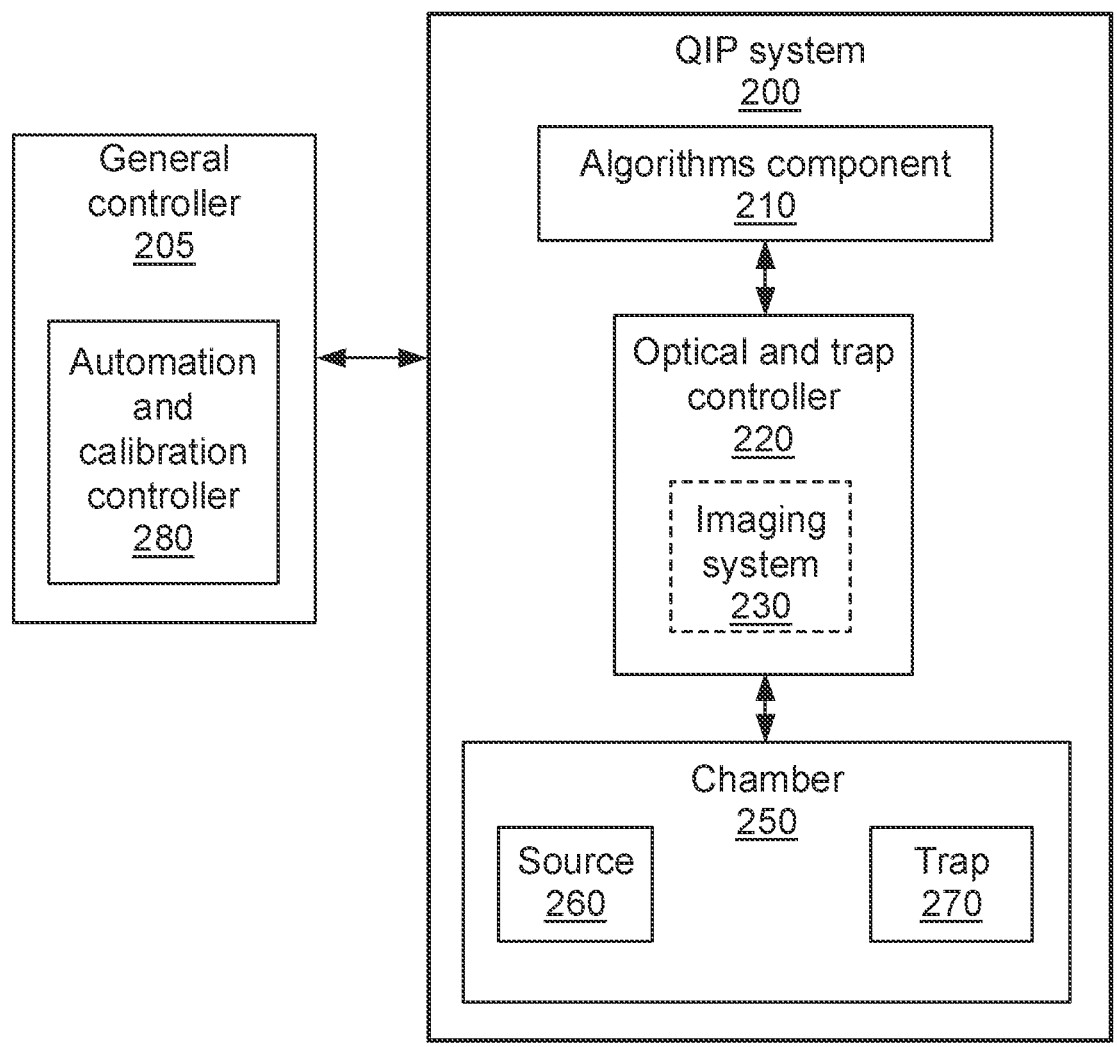
FIG. 2 illustrates an example of a quantum information processing (QIP) system in accordance with aspects of this disclosure.

FIG. 1 illustrates a diagram 100 with multiple atomic ions 106 (e.g., atomic ions 106a, 106b, . . . , 106c, and 106d) trapped in a linear crystal or chain 110 using a trap (the trap can be inside a vacuum chamber as shown in FIG. 2). The trap maybe referred to as an ion trap. The ion trap shown may be built or fabricated on a semiconductor substrate, a dielectric substrate, or a glass die or wafer (also referred to as a glass substrate). The atomic ions 106 may be provided to the trap as atomic species for ionization and confinement into the chain 110.

In the example shown in FIG. 1, the trap includes electrodes for trapping or confining multiple atomic ions into the chain 110 that are laser-cooled to be nearly at rest. The number of atomic ions (N) trapped can be configurable and more or fewer atomic ions may be trapped. The atomic ions can be Ytterbium ions (e.g., $^{171}Yb^+$ ions), for example. The atomic ions are illuminated with laser (optical) radiation tuned to a resonance in $^{171}Yb^+$ and the fluorescence of the atomic ions is imaged onto a camera or some other type of detection device. In this example, atomic ions may be separated by about 5 microns (μm) from each other, although the separation may be smaller or larger than 5 μm. The separation of the atomic ions is determined by a balance between the external confinement force and Coulomb repulsion and does not need to be uniform. Moreover, in addition to atomic Ytterbium ions, neutral atoms, Rydberg atoms, different atomic ions or different species of atomic ions may also be used. The trap may be a linear RF Paul trap, but other types of confinement may also be used, including optical confinements. Thus, a confinement device may be based on different techniques and may hold ions, neutral atoms, or Rydberg atoms, for example, with an ion trap being one example of such a confinement device. The ion trap may be a surface trap, for example.

In some instances, to improve operational performance, the chain 110 may be placed inside a cryogenic environment such as the ones described herein.

FIG. 2 is a block diagram that illustrates an example of a QIP system 200 in accordance with various aspects of this disclosure. The QIP system 200 may also be referred to as a quantum computing system, a quantum computer, a computer device, a trapped ion system, or the like. The QIP system 200 may be part of a hybrid computing system in which the QIP system 200 is used to perform quantum computations and operations and the hybrid computing system also includes a classical computer to perform classical computations and operations.

Shown in FIG. 2 is a general controller 205 configured to perform various control operations of the QIP system 200. Instructions for the control operations may be stored in memory (not shown) in the general controller 205 and may be updated over time through a communications interface (not shown). Although the general controller 205 is shown separate from the QIP system 200, the general controller 205 may be integrated with or be part of the QIP system 200. The general controller 205 may include an automation and calibration controller 280 configured to perform various calibration, testing, and automation operations associated with the QIP system 200.

The QIP system 200 may include an algorithms component 210 that may operate with other parts of the QIP system 200 to perform quantum algorithms or quantum operations, including a stack or sequence of combinations of single qubit operations and/or multi-qubit operations (e.g., two-qubit operations) as well as extended quantum computations. As such, the algorithms component 210 may provide instructions to various components of the QIP system 200 (e.g., to the optical and trap controller 220) to enable the implementation of the quantum algorithms or quantum operations. The algorithms component 210 may receive information resulting from the implementation of the quantum algorithms or quantum operations and may process the information and/or transfer the information to another component of the QIP system 200 or to another device for further processing.

The QIP system 200 may include an optical and trap controller 220 that controls various aspects of a trap 270 in a chamber 250, including the generation of signals to control the trap 270, and controls the operation of lasers and optical systems that provide optical beams that interact with the atoms or ions in the trap. When used to confine or trap ions, the trap 270 may be referred to as an ion trap. The trap 270, however, may also be used to trap neutral atoms, Rydberg atoms, different atomic ions or different species of atomic ions. The lasers and optical systems can be at least partially located in the optical and trap controller 220 and/or in the chamber 250. For example, optical systems within the chamber 250 may refer to optical components or optical assemblies.

The QIP system 200 may include an imaging system 230. The imaging system 230 may include a high-resolution imager (e.g., CCD camera) or other type of detection device (e.g., photomultiplier tube or PMT) for monitoring the atomic ions while they are being provided to the trap 270 and/or after they have been provided to the trap 270. In an aspect, the imaging system 230 can be implemented separate from the optical and trap controller 220, however, the use of fluorescence to detect, identify, and label atomic ions using image processing algorithms may need to be coordinated with the optical and trap controller 220.

In addition to the components described above, the QIP system 200 can include a source 260 that provides atomic species (e.g., a plume or flux of neutral atoms) to the chamber 250 having the trap 270. When atomic ions are the basis of the quantum operations, that trap 270 confines the atomic species once ionized (e.g., photoionized). The trap 270 may be part of a processor or processing portion of the QIP system 200. That is, the trap 270 may be considered at the core of the processing operations of the QIP system 200 since it holds the atomic-based qubits that are used to perform the quantum operations or simulations. At least a portion of the source 260 may be implemented separate from the chamber 250.

It is to be understood that the various components of the QIP system 200 described in FIG. 2 are described at a high-level for ease of understanding. Such components may include one or more sub-components, the details of which may be provided below as needed to better understand certain aspects of this disclosure.

For example, at least parts of the chamber 250 may operate under cryogenic conditions. In one example, the chamber 250 may be a cryostat or comprise a cryostat to provide specific cryogenic conditions. The chamber 250 may support one or more stages (see e.g., FIG. 5 below). In one example, the chamber 250 may support a stage at 4 Kelvin. In another example, the chamber 250 may support a first stage or first environment at 40 Kelvin, and a second stage or second environment within the first stage at 4 Kelvin.

Figure 3:
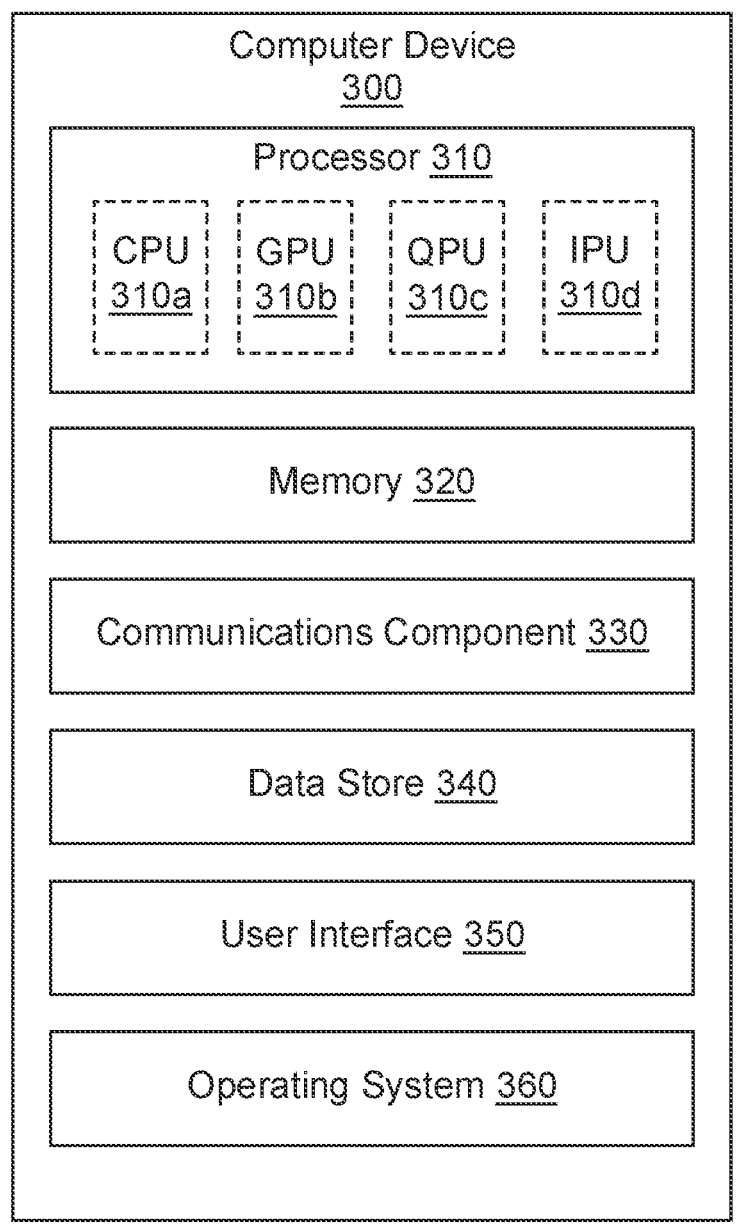
FIG. 3 illustrates an example of a computer device in accordance with aspects of this disclosure.

Referring now to FIG. 3, illustrated is an example of a computer system or device 300 in accordance with aspects of the disclosure. The computer device 300 can represent a single computing device, multiple computing devices, or a distributed computing system, for example. The computer device 300 may be configured as a quantum computer (e.g., a QIP system), a classical computer, or to perform a combination of quantum and classical computing functions, sometimes referred to as hybrid functions or operations. For example, the computer device 300 may be used to process information using quantum algorithms, classical computer data processing operations, or a combination of both. In some instances, results from one set of operations (e.g., quantum algorithms) are shared with another set of operations (e.g., classical computer data processing). A generic example of the computer device 300 implemented as a QIP system capable of performing quantum computations and simulations is, for example, the QIP system 200 shown in FIG. 2.

The computer device 300 may include a processor 310 for carrying out processing functions associated with one or more of the features described herein. The processor 310 may include a single or multiple set of processors or multi-core processors. Moreover, the processor 310 may be implemented as an integrated processing system and/or a distributed processing system. The processor 310 may include one or more central processing units (CPUs) 310a, one or more graphics processing units (GPUs) 310b, one or more quantum processing units (QPUs) 310c, one or more intelligence processing units (IPUs) 310d (e.g., artificial intelligence or AI processors), or a combination of some or all those types of processors. In one aspect, the processor 310 may refer to a general processor of the computer device 300, which may also include additional processors 310 to perform more specific functions (e.g., including functions to control the operation of the computer device 300).

The computer device 300 may include a memory 320 for storing instructions executable by the processor 310 to carry out operations. The memory 320 may also store data for processing by the processor 310 and/or data resulting from processing by the processor 310. In an implementation, for example, the memory 320 may correspond to a computer-readable storage medium that stores code or instructions to perform one or more functions or operations. Just like the processor 310, the memory 320 may refer to a general memory of the computer device 300, which may also include additional memories 320 to store instructions and/or data for more specific functions.

It is to be understood that the processor 310 and the memory 320 may be used in connection with different operations including but not limited to computations, calculations, simulations, controls, calibrations, system management, and other operations of the computer device 300, including any methods or processes described herein.

Further, the computer device 300 may include a communications component 330 that provides for establishing and maintaining communications with one or more parties utilizing hardware, software, and services. The communications component 330 may also be used to carry communications between components on the computer device 300, as well as between the computer device 300 and external devices, such as devices located across a communications network and/or devices serially or locally connected to computer device 300. For example, the communications component 330 may include one or more buses, and may further include transmit chain components and receive chain components associated with a transmitter and receiver, respectively, operable for interfacing with external devices. The communications component 330 may be used to receive updated information for the operation or functionality of the computer device 300.

Additionally, the computer device 300 may include a data store 340, which can be any suitable combination of hardware and/or software, which provides for mass storage of information, databases, and programs employed in connection with the operation of the computer device 300 and/or any methods or processes described herein. For example, the data store 340 may be a data repository for operating system 360 (e.g., classical OS, or quantum OS, or both). In one implementation, the data store 340 may include the memory 320. In an implementation, the processor 310 may execute the operating system 360 and/or applications or programs, and the memory 320 or the data store 340 may store them.

The computer device 300 may also include a user interface component 350 configured to receive inputs from a user of the computer device 300 and further configured to generate outputs for presentation to the user or to provide to a different system (directly or indirectly). The user interface component 350 may include one or more input devices, including but not limited to a keyboard, a number pad, a mouse, a touch-sensitive display, a digitizer, a navigation key, a function key, a microphone, a voice recognition component, any other mechanism capable of receiving an input from a user, or any combination thereof. Further, the user interface component 350 may include one or more output devices, including but not limited to a display, a speaker, a haptic feedback mechanism, a printer, any other mechanism capable of presenting an output to a user, or any combination thereof. In an implementation, the user interface component 350 may transmit and/or receive messages corresponding to the operation of the operating system 360.

When the computer device 300 is implemented as part of a cloud-based infrastructure solution, the user interface component 350 may be used to allow a user of the cloud-based infrastructure solution to remotely interact with the computer device 300.

In connection with the systems described in FIGS. 1-3, this disclosure further discloses techniques for monitoring cryogenic vibrations and implementing either feedback or feed-forward control to null the impact of the vibration on components mounted inside of the cryostat for stabilization.

In general, vibration amplitudes inside cryostats (e.g., chambers operating at cryogenic temperatures/conditions) range from 10s of nanometers to 100s of microns due to the noise injected by the helium pumping necessary to maintain cryogenic temperatures. The frequency of oscillation of the cryocooler vibrations are typically in the range of 1-5 Hz, but depending on the mechanical resonances of the cryostat and associated mechanics, the induced frequency spectrum can extend much higher and be either narrowband or broadband. The vibration environment inside a cryostat may differ significantly from the vibration environment outside of the cryostat, which presents challenges if components mounted in these two environments need to be highly stable relative to one another. For laser beam delivery systems that operate in both outside and inside cryogenic environments, and that require highly precise path lengths, non-contact displacement monitoring and active control can be used to achieve interferometric stability between optical components.

In an example aspect, it may be advantageous for the displacement monitoring to be non-contact due to the strict thermal isolation constraints between the different parts of the cryostat that are operated at different temperatures. For example, the outside environment may be at room temperature (e.g., 300 Kelvin) and the cryostat platform is at a cryogenic temperature (e.g., 4 Kelvin). In such a setting, a contacted measurement linkage would create a thermal short. A measurement may need to be taken at both room temperature and at a cryogenic temperature, and typically at stages in between, so the non-contact measurement needs to be able to operate across a broad temperature range. Additionally, cryostats typically operate in a high vacuum environment, so the non-contact measurement needs to also be able to operate under high vacuum conditions.

In an example aspect, non-contact displacement sensing can be implemented using an interferometer sensor. Interferometry-based displacement measurements rely on the interference pattern of two beam paths. The resulting interference pattern when the beams are recombined indicates the change in displacement between the sensor head and the reflective target surface that is aligned with the sensor.

Figure 4:
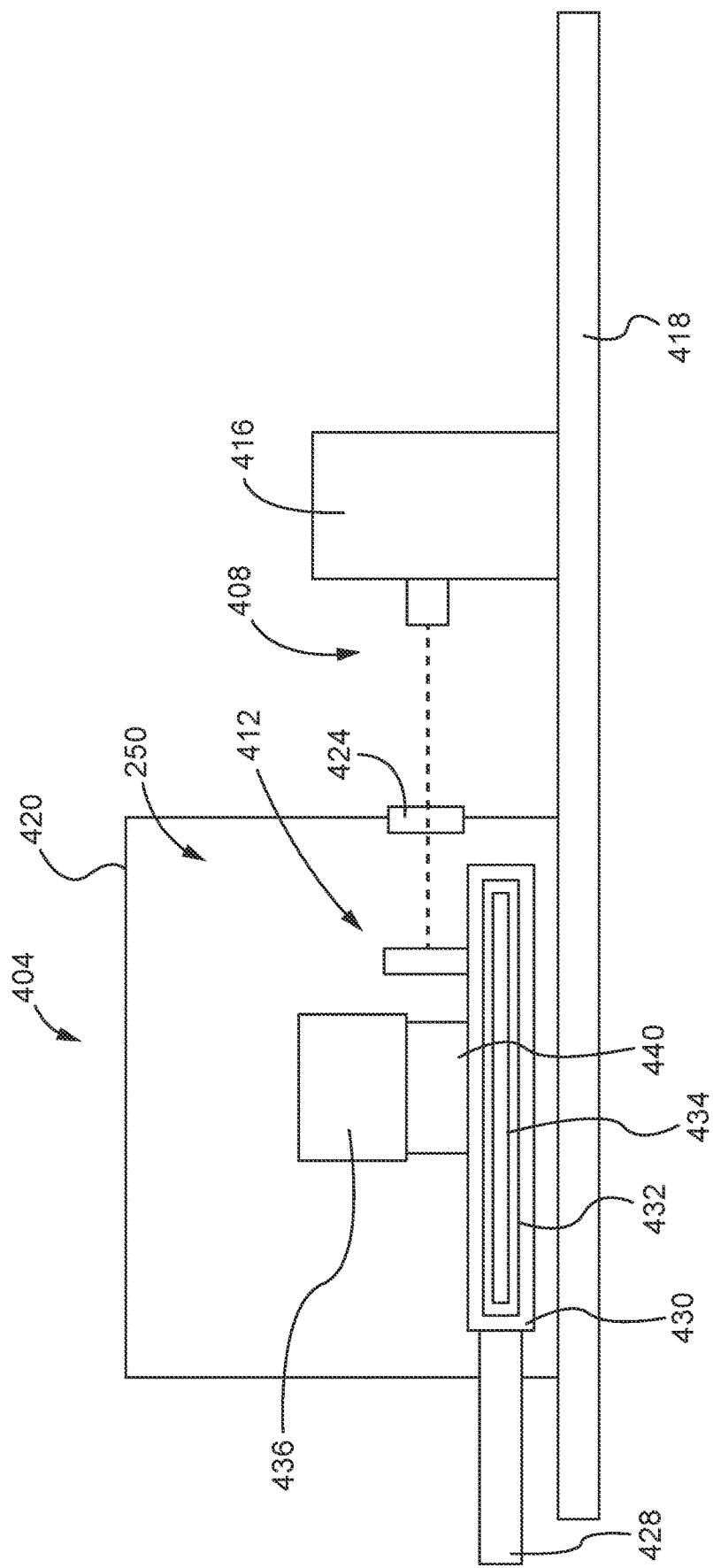
FIG. 4 illustrates an example of an interferometer-based non-contact sensing system and stabilization technique in accordance with aspects of this disclosure.

FIG. 4 illustrates an example of an interferometer-based non-contact sensing system 400 configured to stabilize components positioned within a cryostat 404. As shown, the system 400 includes an interferometer sensor 408, a reflective target 412 and a interferometer sensor mount 416. As is described in greater detail below, in the example of FIG. 4, the interferometer sensor 408, which is coupled to the interferometer sensor mount 416, is positioned outside of the cryostat 404 and is under ambient temperature conditions. The interferometer sensor mount 416 and a cryostat 404 are coupled to a base plate or optical table 418. In the example aspect, the reflective target 412 is positioned within the chamber 250 (e.g., as shown in FIG. 2) of the cryostat 404. As discussed in greater detail below, vibrations of the cryostat 404 are not transmitted to the interferometer sensor mount 416 through the base plate 418. However, the displacements within the cryostat 404 caused, for example, by the vibrations and/or thermal contraction as the cryostat 404 is cooled to cytostatic temperatures are transmitted to the reflective target 412, as described in greater detail below, such that these displacements can be detected by the interferometer sensor 408.

The cryostat 404 includes a housing 420 that defines the cryostat chamber 250 according to an example aspect. Moreover, the housing 420 also provides a vacuum that insulates the cryostat chamber 250 from the ambient temperature conditions surrounding the cryostat 404. The cryostat housing 420 may include one or more viewports 424 that are configured to allow optical access to the cryostat chamber 250. A helium flow line 428 is configured to provide a flow of cooled helium to a cryogenic base plate 430 to maintain the cryostat chamber 250 at cryostatic temperatures. A first stage or intermediate cooling stage 432 and a second stage or cryostatic stage 434 are coupled to the cryogenic base plate 430. A temperature of the first stage 432 is maintained at approximately 40 K and a temperature of the second stage 434 is maintained at approximately 4 K. One or more components 436, such as ion traps and/or optical components may be mounted to the cryostat stages to maintain the component(s) 436 at the temperature of the particular cryostat stage. In the illustrated aspect, the component(s) 436 may be coupled to the second stage 434. The component(s) 436 may be coupled to the cryostat stage via an actuator 440, such as an piezoelectric transducer, such that the position of the one or more component(s) 436 can be dynamically adjusted relative external components, such as laser beam delivery systems, that are mounted outside of the cryostat 404. In other aspects, the actuator 440 may include coil actuators, magnetic motors, and other cryogenic-compatible motion devices. In aspects in which the actuator 440 is a piezoelectric transducer and the component(s) 436 are repositioned along multiple axes, the actuator 440 may include multiple stacked piezoelectric transducers. The actuator 440 may be communicatively coupled to a controller, such as the general controller 205 or the optical and trap controller 220 such that the component(s) 436 can be repositioned.

As further shown in FIG. 4, the reflective target 412 is coupled to the cryostat stage 432, 434, or one of the components 436. For example, as described in greater detail below, when feed-forward control methods are used, the reflective target 412 is coupled to the same stage 432, 434 as the one or more component(s) 436, but not to the one or more component(s) 436. When feedback control methods are used, the reflective target 412 is coupled to one of the one or more the component(s) 436. The reflective target 412 and the interferometer sensor 408 are both aligned with the viewport 424 such that the interferometer sensor 408 can interact with the reflective target 412 through the viewport 424.

During operation of the cryostat 404, there may be vibrations in the cryogenic base plate 430, for example, due to pumping helium through the helium flow line 428. Under such conditions, the component(s) 436 and the reflective target 412 both experience the vibrations of the cryogenic base plate 430. The internal component(s) 436 (e.g., a trap or optical component) experiences a well-defined response to the cryogenic base plate 430 vibration. These vibrations cause the reflective target 412 to move relative to the interferometer sensor mount 416. Therefore, the interferometer sensor 408 can be configured to receive information indicative of the displacements of the component(s) 436 positioned within the cryostat chamber 250 based on the displacements of the reflective target 412.

According to the example aspect, the interferometer sensor 408 and the reflective target 412 are oriented relative to the viewport 424, such that the interferometer sensor 408 is configured to interact with the reflective target 412 through the viewport 424. Since the interferometer sensor 408 is outside of the cryostat 404, the interferometer sensor 408 can provide a one-stage (e.g., direct), non-contact way to measure displacements within a high vacuum, very cold environment from an environment at ambient temperature and pressure.

In the illustrated implementation, the system 400 includes one interferometer sensor 408 and one reflective target. In other implementations, the system 400 may include additional interferometer sensors and reflective targets oriented to measure displacements along different than the interferometer sensor 408.

The interferometer sensor 408 may be configured to transmit information indicative of the sensed displacements of the reflective target 412 to the general controller 205 or the optical and trap controller 220. The controller 205, 220 may be configured to determine displacement of the component(s) 436 based on the displacement of the reflective target 412. The controller 205, 220 may be configured to generate a repositioning command to actuate the piezoelectric transducer 440 to dynamically reposition the component(s) 436 based on the determined displacement. The controller 205, 220 may be configured to transmit the repositioning command to the piezoelectric transducer 440. In aspects in which feed-forward control is used, the controller 205, 220 may directly adjust the system in a predetermined way based on the determined displacement. For example, the controller 205, 220 may generate the repositioning command based on one or more look-up tables based on the determined displacement.

In aspects in which feedback control is used, the controller 205, 220 may configured to compare the determined deflection to a predefined threshold to generate an error signal. The controller 205, 220 may be configured to generate the repositioning command based on the error signal.

Figure 5:
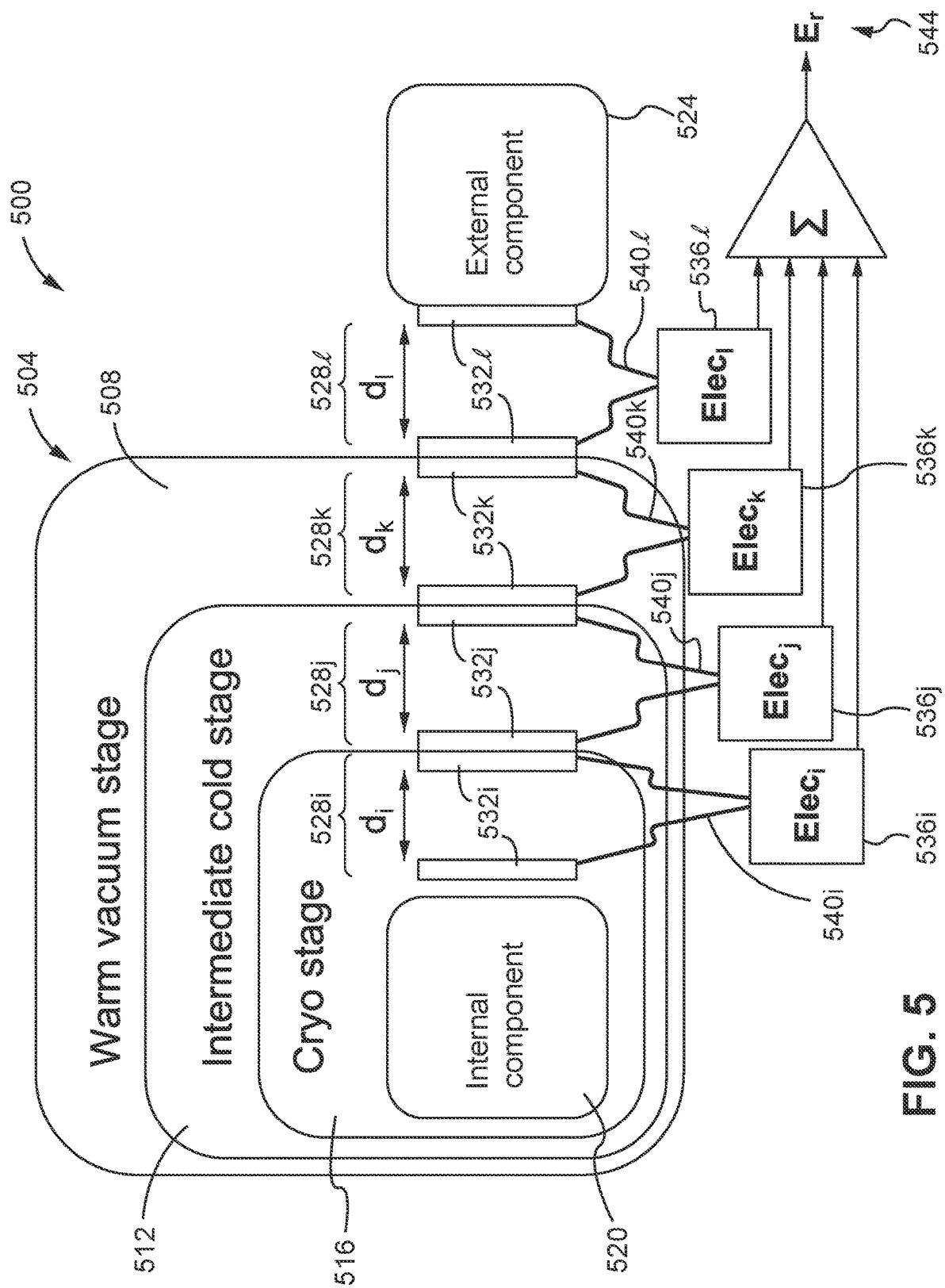
FIG. 5 illustrates an example of a capacitive-displacement-based sensing system and stabilization technique in accordance with aspects of this disclosure.

FIG. 5 illustrates a schematic representation of an example of a non-contacting capacitive-displacement-based sensing system 500 and stabilization technique for one or more components positioned within a cryostat 504. As shown, the cryostat 504 includes a housing 508 that includes a vacuum stage between the cryogenic chamber 250 and the external embodiment. The cryostat 504 further includes a first or intermediate cooling stage 512, which is maintained at a temperature of approximately 40 K, and a second or cryostatic stage 516, which is maintained at a temperature of approximately 4 K. One or more internal components 520, such as ion traps or optical components, may be positioned in the cryostat chamber 250 and coupled to one of the stages 512, 516. An actuator may be coupled to the one more internal components 520 such that a position of the one or more internal component(s) may be adjusted relative to a position of an external component 524, such as a laser beam delivery system, positioned outside of the cryostat 504. Example actuators may include piezoelectric actuators, coil actuators, magnetic motors, and other cryogenic-compatible motion devices.

Capacitive displacement sensing relies on precision electrical measurements of a change in capacitance, which is proportional to the separation of the capacitive plates. Rather than optical access and a laser, the capacitive displacement sensing systems include capacitive sensing assemblies 528 including a pair of capacitive plates 532 coupled to capacitive sensors 536, for example by wires 540.

Each of the capacitive plates 532 are positioned a distance d apart. Each of the capacitive sensors 536 is in communication with a controller such as the general controller 205 or the optical and trap controller 220. Capacitive displacement sensing systems 500 include a capacitive sensing assembly 528 positioned on each barrier (e.g., vacuum stage of housing 508, first stage 512, second stage 516) positioned between the internal component 520 and the external component 524. Each of the capacitive sensing assemblies described below is substantially similar to the capacitive sensing assembly 528. Subscripts are used to indicate the components of capacitive sensing assemblies 528 coupled to between the internal component 520 and the external component 524. The capacitances determined by each of the capacitive sensing assemblies 528 is summed to generate a control signal to dynamically reposition the internal component 520 relative to the external component 520, as described in greater detail below.

Since the housing 508 defines a vacuum between the cryostat chamber 250 and the ambient environment, at least one barrier is between the internal and external components 520, 524 that are to be stabilized relative to each other. Depending on where the internal component 520 is mounted, there can be additional barriers between the internal components 520, 524, such as the first stage 512 and the second stage 516. Multiple capacitive sensing assemblies 528 can be arranged in a cascaded fashion between the first component 520, the barriers 508-516, and the external component 524.

In the implementation shown in FIG. 5, the internal component 520 is coupled to the second stage 516 of the cryostat 504. A first capacitive sensing assembly $528_i$ is coupled to the second stage 516 of the cryostat 504 or to the internal component 520 to determine displacements of the second stage 516. For example, in implementations in which feed-forward control methods are used, the pair of capacitive plates $532_i$ is coupled to the second stage 516. In implementations in which feedback control methods are used, the pair of capacitive plates $532_i$ is coupled to the internal component 520. In configurations in which the internal component 520 is coupled to the first stage 512 of the cryostat 504, the first capacitive sensing assembly $528_i$ can be omitted.

A second capacitive sensing assembly $528_j$ is coupled to the first stage 512 of the cryostat 504 to determine displacements of the first stage 512. A third capacitive sensing assembly 528k is coupled to the housing 508 of the cryostat 504 to determine displacements of the housing 508. A fourth capacitive sensing assembly $528_l$ is coupled to the external component 524. Each of the capacitive sensors $536_i$-$536_l$ is coupled to a summation module 544.

Parameters of each of the capacitive sensing assemblies $528_i$-$528_l$ can optimized for the specific conditions of each of the capacitive sensing assemblies 528. Example parameters include the distances $d_i$-$d_l$ between the pairs of capacitive plates $532_i$-$532_l$, working ranges of the pairs of capacitive plates $532_i$-$532_j$ and/or sensors $536_i$-$536_l$ etc.). The signals from the sensors $536_i$-$536_l$ can be read separately individually by the controller 205, 220 or combined (e.g., by a summation module) in any permutation to measure the cascaded signals and determine the relative behavior between barriers. As shown in FIG. 5, four capacitive signals are summed together in phase by a summation module 544 to generate the control signal, $E_r$. The control signal $E_r$ can be used to compensate for the vibrations in the cryostat 504 in the form of a control signal.

For example, the controller 205, 220 may be configured to determine displacement of the component(s) 436 based on the control signal $E_r$. The controller 205, 220 may be configured to generate a repositioning command to actuate the actuator to reposition the internal component(s) 520 based on the determined displacement. The controller 205, 220 may be configured to transmit the repositioning command to the actuator. In aspects in which feed-forward control is used, the controller 205, 220 may directly adjust the system in a predetermined way based on the determined displacement. For example, the controller 205, 220 may generate the repositioning command based on one or more look-up tables based on the determined displacement.

In some aspects, the controller 205, 220 may configured to compare the determined deflection to a predefined threshold to generate an error signal. The controller 205, 220 may be configured to generate the repositioning command based on the error signal.

Advantageously, this non-contacting capacitive-displacement-based sensing system 500 is compact and relatively simple, needing just a few wires 540 per capacitive sensor 536. The use of different capacitive sensing assemblies 528 for each of the first and second stages 512, 516 and the housing 508 provides detailed information about the amplitude of vibrations at different stages between the internal and external components 520, 524, which can be used for potential additional sensing and control functionalities.

Compared to interferometer-based displacement sensing systems, capacitive displacement sensing systems can have simpler implementation, at least in some situations. For example, capacitive displacement sensors do not need to maintain precise optical alignment after the cryostat has cooled to operating temperatures. Therefore, such systems can be used without viewports in the cryostat housing. Since interferometer sensor heads rely on the optical interference pattern from a reflected beam bouncing off a target, adjustment to the necessary degrees of freedom must be provided to correct misalignments experienced by the reflective target during cooldown. If the interferometer sensor head is located within the cryostat, correcting the sensor's misalignment with the target could prove challenging. The capacitive displacement sensing system is simpler and more robust, simply requiring that the distance between the sensor tip and the target surface remain within the working range of the sensor. The working range can be selected based on the calculated thermal contractions for a given installation. Additionally, shims can be used when locating and installing the sensors at ambient operating conditions such that the sensor falls within its working range after cooldown.

There may be instances in which it may be possible or suitable to include both interferometer-based displacement sensing systems and capacitive displacement sensing systems. For example, in an example aspect, aspects of the interferometer-based non-contact sensing system and stabilization technique in FIG. 4 can be combined with aspects of the capacitive-displacement-based sensing system and stabilization technique to provide a more robust or accurate control operation.

Moreover, feed-forward control can be used to compensate for disturbances in a system by directly adjusting the system in a predetermined way based on the measurement of the disturbance. Control mechanisms may also use feedback control, which measures the disturbance's effect on an error signal and uses different control methods to implement corrective measures on the system's input signals to reject the disturbance. Because the vibration response of components installed inside the cryostat are relatively well-understood, measurable, and on a long enough time scale for corrective actions to be implemented, feed-forward control can be used to compensate for the relative displacements between ambient and cryogenic operating environments. Moreover, since the frequency spectrum and amplitude of the cryostat vibrations are relatively stable, feed-forward control can be compensated with amplitude and frequency changes caused by vibrations because the QIP system's response to the vibrations can be made linear and well-defined in an example aspect.

The implementation of feedback or feed-forward control depends on the location of a reference surface (e.g., the reflective target 412 for interferometer-based systems or the pair of capacitive plates 532 for capacitive systems) relative to the piezo actuator. For feed-forward control methods, the target surface is separate from the internal component and is not coupled to the piezoelectric actuator, so displacements of the target surface are not corrected, as shown in FIG. 4. For feedback control methods, the target surface is coupled to the internal component and experiences the displacement corrections from the piezoelectric actuator, thus including the measured disturbance in the control loop.

Inherent vibration of the cryostat produces predictable vibrations in the internal components coupled to the cryostat. The vibrations experienced by the internal components can be quantified using non-contact displacement sensing systems. As illustrated in both FIGS. 4 and 5, a reference surface inside of the cryostat is not coupled to the internal component that is to be stabilized relative to the external component for feed-forward control. Instead, the reference surface is coupled to the same phase of the cryostat as the internal component that is to be stabilized. For feedback control, the reference surface is coupled to the internal component that is to be stabilized. For this reason, feed-forward control may be easier to implement, and any appropriate measurement surface can be used for generating the control signal, not just ones attached to the internal component.

For feed-forward control methods, it is assumed that the displacements experienced by the reference surface are substantially similar to those experienced by the internal component. The piezoelectric transducer provides corrective actions to adjust the position of the internal component based on the relative displacement between the reference surface and the external component. The corrective actions of the feed-forward controller maintain nanometer stability of the relative positions of the internal and external components, which is especially important for interferometric applications. A piezoelectric transducer actuator that can be used to implement corrective action. Piezoelectric transducers may be advantageous actuators to correct for vibration disturbances due to their load capacity, speed, and minimum incremental motion. Other example actuators include coil actuators, magnetic motors, and other cryogenic-compatible motion devices.

Capacitive displacement sensors and interferometers are used in this stabilization method due to the high resolution and accuracy needed to measure the cryostat's vibration levels. However, capacitive displacement sensors may have several advantages over interferometers. FIG. 4 illustrates an implementation example for stabilizing 1 axis; additional non-contact sensors can be implemented to stabilize all 3 axes of the internal component relative to the ambient or reference conditions. Successful implementation also requires that the firmware and electronics correcting for the vibration introduced by the cryocooler have equally high resolution and accuracy to effectively stabilize the components.

As a general matter, it is noted that the components and aspects of FIGS. 4 and 5 above can be implemented in, for example, the chamber 250 shown in FIG. 2 as described above. Moreover, the techniques described herein for feedback or feed-forward control may be implemented using a controller (e.g., hardware and/or firmware) that may be part of, for example, the optical and trap controller 220 and/or the general controller 205 (e.g., part of the automation and calibration controller 280). The feedback or feed-forward control may also be implemented using an independent controller (not shown) that is part of the QIP system 200 but used either solely or mostly for adjusting cryogenic vibrations.

The previous description of the disclosure is provided to enable a person skilled in the art to make or use the disclosure. Various modifications to the disclosure will be readily apparent to those skilled in the art, and the common principles defined herein may be applied to other variations without departing from the scope of the disclosure. Furthermore, although elements of the described aspects may be described or claimed in the singular, the plural is contemplated unless limitation to the singular is explicitly stated. Additionally, all or a portion of any aspect may be utilized with all or a portion of any other aspect, unless stated otherwise. Thus, the disclosure is not to be limited to the examples and designs described herein but is to be accorded the widest scope consistent with the principles and novel features disclosed herein.

What is claimed is:

1. A quantum information processing (QIP) system comprising:
    a cryostat comprising a chamber including at least one stage;
    a component coupled to the at least one stage;
    an actuator coupled to the component;
    a non-contact displacement measurement system configured to determine information indicative of displacement of the component during operation of the cryostat; and
    a controller configured to:
        receive the information indicative of the displacement of the component from the non-contact displacement measuring system; and
        generate a repositioning command for the actuator to reposition the component based on the information indicative of the displacement of the component.

2. The QIP system of claim 1, wherein the non-contact displacement measurement system includes an interferometer sensor.

3. The QIP system of claim 2, wherein the interferometer sensor is positioned outside of the chamber and configured to interact with a reflective target coupled to the component or coupled to the at least one stage to determine information indicative of the displacement of the component interference pattern of beam paths.

4. The QIP system of claim 1, wherein the non-contact displacement measurement system includes at least one capacitive sensor.

5. The QIP system of claim 4, wherein the non-contact displacement measurement system includes a cascade of capacitive displacement sensors.

6. The QIP system of claim 4, wherein the capacitive displacement sensor is coupled to a pair of capacitive plates that are coupled to the component or coupled to the at least one stage.

7. The QIP system of claim 4, wherein a summation module is configured to sum the sensed capacitances from each of the at least one capacitive sensors together in phase to determine the information indicative of the displacement.

8. The QIP system of claim 7, wherein the information indicative of the displacement is based on displacement of the component coupled to the at least one stage and a component positioned outside of the cryostat.

9. The QIP system of claim 1, wherein the controller is configured to perform a feedback or feed-forward control operation.

10. The QIP system of claim 1, wherein the component is at least one of an ion trap, an optical component, and an optical assembly.

11. The QIP system of claim 1, wherein the repositioning command is configured to dynamically reposition the component to compensate for vibrations of the cryostat.

12. A method for performing a non-contact displacement measurement for cryogenic stabilization in quantum information processing (QIP) systems, the method comprising:
    receiving information indicative of displacement of a component coupled within a chamber of a cryostat of the QIP system during operation of the cryostat from a non-contact displacement measurement system, wherein the component is coupled to a stage of the cryostat;
    generating a component repositioning command based on the information indicative of the displacement of the component; and
    commanding an actuator coupled to the component to reposition the component.

13. The method of claim 12, wherein the non-contact displacement measurement system includes an interferometer sensor.

14. The method of claim 13, wherein the interferometer sensor is positioned outside of the chamber and configured to interact with a reflective target coupled to the component or coupled to the at least one stage.

15. The method of claim 12, wherein the non-contact displacement measurement system includes at least one capacitive sensor.

16. The method of claim 15, wherein the non-contact displacement measurement system includes a cascade of capacitive displacement sensors.

17. The method of claim 15, wherein the capacitive displacement sensor is coupled to a pair of capacitive plates that are coupled to the component or coupled to the stage.

18. The method of claim 12, wherein the method is a feedback control operation or a feed-forward control operation.

19. The method of claim 12, wherein the component is at least one of an ion trap, an optical component, and an optical assembly.

20. The method of claim 12, wherein the repositioning command is configured to dynamically reposition the component to compensate for vibrations of the cryostat.

* * * * *